(No Model.)
G. W. COTTINGHAM.
Combined Fire Shovel and Tongs.
No. 241,935. Patented May 24, 1881.
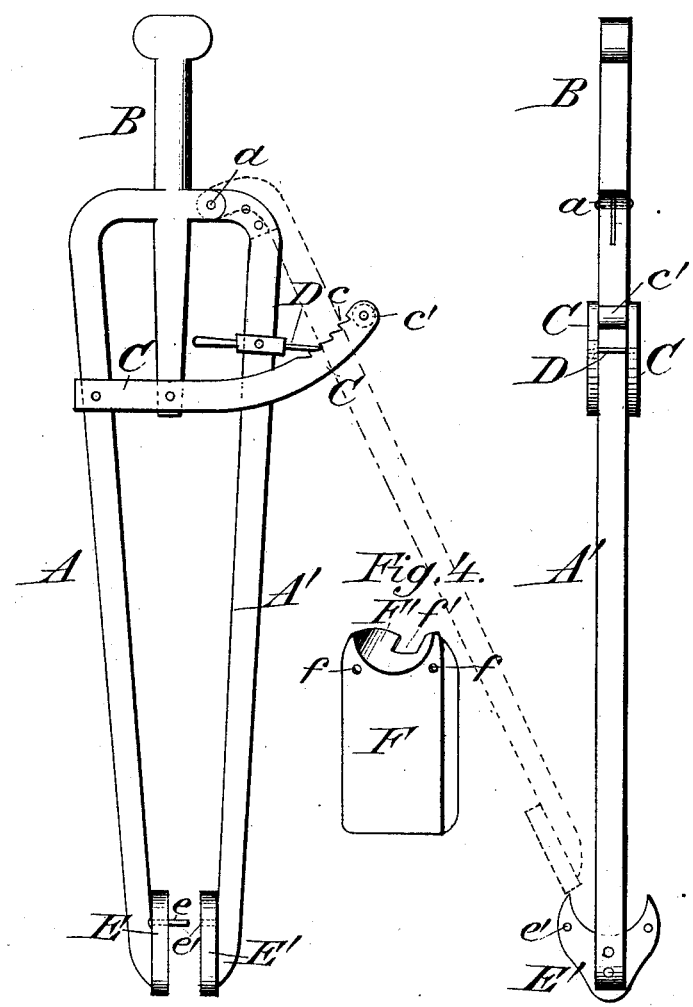
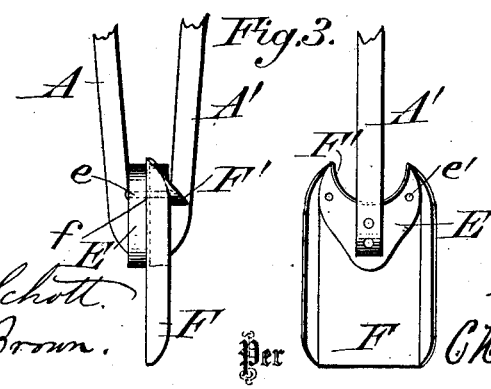
Witnesses:
F. H. Schott.
A. R. Brown.
Inventor
Gideon W. Cottingham
per C. H. Watson & Co. Attorneys.

UNITED STATES PATENT OFFICE.

GIDEON W. COTTINGHAM, OF MARIANNA, ARKANSAS.

COMBINED FIRE SHOVEL AND TONGS.

SPECIFICATION forming part of Letters Patent No. 241,935, dated May 24, 1881.

Application filed February 28, 1881. (No model.)

*To all whom it may concern:*

Be it known that I, GIDEON W. COTTINGHAM, of the town of Marianna, in the county of Lee and State of Arkansas, have invented certain new and useful Improvements in Combined Fire Shovel and Tongs; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to fire tongs and shovels; and it consists in the construction and arrangement of devices, as hereinafter more fully described and claimed.

In the annexed drawings, in which like letters indicate like parts in the several views, Figure 1 is a side view of the tongs. Fig. 2 is an edge view. Fig. 3 shows partial views with the shovel attached, and Fig. 4 is a view of the shovel.

A A' represent the arms of the tongs, which are pivoted or hinged at $a$.

To the arm A is attached the handle B, which also forms a brace for the support of the curved ratchet-arms C C, that are secured transversely to the arm A and lower end of the handle B. These arms C C are provided with ratchet-teeth $c\ c$, that engage with a pawl, D, on the arm A'. They are also connected at their outer ends by a pin or cross-piece, $c'$, that limits the outward movement of the arm A'.

To the extreme ends of the arms A A' are secured the double hooks or flukes E E', the fluke E being provided with pins $e$, that enter corresponding apertures, $e'$, in the fluke E', and prevent lateral movement of the parts upon each other. These flukes, besides being useful for grasping and lifting purposes, also serve for the attachment of the shovel F. The shovel F is provided with apertures $f\!f$, and at its rear end has a curved upward-projecting flange, F', having a central slot or opening, $f'$.

When in position this shovel rests on the inner surface of the fluke E, the pins $e$ passing through the apertures $f$ and into the openings $e'$, while the flange F' fits against the curved or double-hooked end of the fluke E', and the arm A' rests in the slot $f'$. If the pawl D is now engaged with the ratchets $c\ c$, the shovel will be securely locked in place.

When the implement is to be used as tongs only the pawl D is released from its engagement with the ratchets $c\ c$ and the shovel removed. The tongs may be then used in the ordinary manner, and it will be found that by means of the pawl and ratchet the arms A A', after grasping the object, may be readily locked, so as to hold the same firmly.

The manner in which the arms A A' are connected with the handle B and ratchet-arms C C adds greatly to the strength of the implement, and, in connection with the flukes E E', renders it more efficient for grasping and holding heavy pieces of fire-wood or other like objects.

Having thus described my invention, what I claim as new, and desire to secure by Letters Patent, is—

1. The combination of the pivoted arms A A', handle B, ratchet-arms C C, having ratchets $c$, pawl D, and flukes E E', substantially as and for the purpose specified.

2. The combination, with the pivoted arms A A', having handle B, and flukes E E', provided with pins $e$ and openings $e'$, of the ratchet-arms C C, pawl D, and shovel F, having apertures $f$, and flange F', provided with slot $f'$, substantially as and for the purpose shown and described.

In testimony that I claim the foregoing as my own I have hereto affixed my signature in presence of two witnesses.

GIDEON W. COTTINGHAM.

Witnesses:
 JOHN COTTINGHAM,
 T. N. SLAYTON.